(12) United States Patent
Mifflin (10) Patent No.: US 12,093,863 B2
(45) Date of Patent: *Sep. 17, 2024

(54) MACHINE LEARNING LABELING PLATFORM FOR ENABLING AUTOMATIC AUTHORIZATION OF HUMAN WORK ASSISTANCE

(71) Applicant: State Farm Mutual Automobile Insurance Company, Bloomington, IL (US)

(72) Inventor: Matthew Aaron Mifflin, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,988

(22) Filed: Aug. 30, 2022

(65) Prior Publication Data

US 2022/0405666 A1 Dec. 22, 2022

Related U.S. Application Data

(63) Continuation of application No. 16/429,960, filed on Jun. 3, 2019, now Pat. No. 11,461,714.

(51) Int. Cl.
*G06Q 10/06* (2023.01)
*G06N 20/00* (2019.01)
(Continued)

(52) U.S. Cl.
CPC ....... *G06Q 10/06313* (2013.01); *G06N 20/00* (2019.01); *G06Q 40/08* (2013.01)

(58) Field of Classification Search
CPC ..................................................... G06Q 10/06
See application file for complete search history.

(56) References Cited

U.S. PATENT DOCUMENTS 10,922,726 B1 * 2/2021 Nelson ............... G06Q 30/0283
2004/0073434 A1 * 4/2004 Volquardsen .......... G06Q 10/06
705/305

(Continued)

FOREIGN PATENT DOCUMENTS

EP 3200139 A1 * 8/2017 ........... G06K 9/6256

OTHER PUBLICATIONS

D S Dima, et al., Solutions for Acceleration Measurement in Vehicle Crash Tests, IOP Conf. Ser.: Mater. Sci. Eng. 252 012007, 2017, 9 pages.

(Continued)

*Primary Examiner* — Kurtis Gills
(74) *Attorney, Agent, or Firm* — Lee & Hayes, P.C.

(57) ABSTRACT

Systems and methods for dynamically assessing property damage by determining whether and how to leverage a crowdsourcing marketplace are provided. According to certain aspects, a server computer may receive a set of media depicting property damage, and may analyze the set of media using a machine learning model to estimate a type and amount of the property damage. The server computer may also determine whether and how to leverage a set of additional individuals to provide a set of assessments for the property damage and, based on the set of assessments provided by the set of additional individuals, the server computer may automatically facilitate a work order request to address the property damage.

20 Claims, 6 Drawing Sheets

(51) Int. Cl.
*G06Q 10/0631* (2023.01)
*G06Q 40/08* (2012.01)

(56) References Cited

U.S. PATENT DOCUMENTS

| | | | |
|---|---|---|---|
| 2004/0148188 A1 | 7/2004 | Uegaki | |
| 2009/0150200 A1 | 6/2009 | Siessman | |
| 2011/0313951 A1* | 12/2011 | Cook | G06Q 30/0283 705/400 |
| 2012/0297337 A1* | 11/2012 | St. Denis | G06Q 30/0613 705/305 |
| 2014/0316825 A1* | 10/2014 | van Dijk | G06Q 40/08 705/4 |
| 2015/0294419 A1* | 10/2015 | Gonzalez Miranda | G06F 3/04842 701/31.6 |
| 2016/0292759 A1* | 10/2016 | Gonzalez Miranda | G06F 3/04845 |
| 2017/0148102 A1* | 5/2017 | Franke | G06Q 30/0601 |
| 2017/0221110 A1* | 8/2017 | Sullivan | G06Q 10/20 |
| 2017/0293894 A1* | 10/2017 | Taliwal | G06V 10/82 |
| 2017/0352104 A1* | 12/2017 | Hanson | G06Q 40/08 |
| 2018/0350163 A1* | 12/2018 | Pofale | G06Q 30/0283 |
| 2021/0081698 A1* | 3/2021 | Lindeman | G06Q 50/30 |

OTHER PUBLICATIONS

McClafferty, K.J., et al., Univerty of Weseren Ontario Accident Research Team, Event Data Recorders in the Analysis of Frontal Impacts, 51st Annual Proceedings, Aassociation for the Advancement of Automotive Medicin, Oct. 15-17, 2007.

Office Action for U.S. Appl. No. 16/429,960, mailed on Apr. 16, 2021, Mifflin, "Machine Learning Labeling Platform for Enabling Automatic Authorization of Human Work Assistance", 14 Pages.

Office Action for U.S. Appl. No. 16/429,960, mailed on Oct. 14, 2021, Mifflin, "Machine Learning Labeling Platform for Enabling Automatic Authorization of Human Work Assistance", 13 Pages.

Non Final Office Action dated Nov. 25, 2020 for U.S. Appl. No. 16/429,960, "Machine Learning Labeling Platform for Enabling Automatic Authorization of Human Work Assistance", Mifflin, 17 pages.

Office Action for U.S. Appl. No. 16/429,960, mailed Mar. 15, 2022, Mifflin, "Machine Learning Labeling Platform for Enabling Automatic Authorization of Human Work Assistance", 15 pages.

Palmer, Telematics in Auto Claims is Inevitable, CCC, Insurance, (https://www.cccis.com/2016/08/18/telematics-auto-claims-inevitable/) Aug. 18, 2016.

* cited by examiner

MACHINE LEARNING LABELING PLATFORM FOR ENABLING AUTOMATIC AUTHORIZATION OF HUMAN WORK ASSISTANCE

PRIORITY

This application is a continuation of, and claims priority to, U.S. patent application Ser. No. 16/429,960, filed on Jun. 3, 2019, entitled "MACHINE LEARNING LABELING PLATFORM FOR ENABLING AUTOMATIC AUTHORIZATION OF HUMAN WORK ASSISTANCE", and is fully incorporated by reference herein.

FIELD

The present disclosure is directed to using machine learning to dynamically assess property damage. More particularly, the present disclosure is directed to platforms and technologies for determining whether and how to employ a crowdsourcing marketplace to supplement a machine learning analysis of a set of media, and automatically generating work orders based on the holistic media analysis.

BACKGROUND

Machine learning is an algorithmic approach to data analysis where a processing system builds a mathematical model based on sample training data, and uses the mathematical model to make predictions or decisions from additional datasets without being explicitly programmed to perform the tasks. As a result, machine learning techniques are able to learn from data, identify patterns, and make determinations with minimal or no human intervention.

A machine learning system may be used for various tasks and applications. However, certain applications of machine learning models are inefficient in resolving the underlying tasks largely due to model inaccuracies. For example, using machine learning models to assess property damage in an attempt to resolve property insurance claims is often inaccurate. Additionally, current methods of addressing these model inaccuracies by manually adjusting model parameters for generating additional accurate models interrupts the business process, among other drawbacks. This interruption unfortunately also requires mass data curation, which is expensive, wastes data, and adds a redundant step to the process of generating models, with minimal payoff regarding increased model accuracy.

Accordingly, there is an opportunity for platforms and techniques that improve on existing techniques for using machine learning models for various applications.

SUMMARY

In an embodiment, a computer-implemented method of using a machine learning model to automatically facilitate work orders is provided. The method may include: receiving, from an electronic device, a set of media depicting a property; analyzing, by a processor using a machine learning model, the set of media data, including: determining (i) an amount of damage to the property depicted in the set of media, and (ii) a type of damage to the property depicted in the set of media, and assessing a confidence level for the amount of damage, wherein the confidence level is below a threshold level; in response to analyzing the set of media data using the machine learning model, availing the set of media for manual review, including: determining, based on the property, a set of individuals needed to manually assess the set of media, each of the set of individuals having a qualification, availing the set of media for review by the set of individuals, receiving a set of assessments of the set of media by the set of individuals, calculating an updated amount of damage to the property based on the set of assessments, and updating the machine learning model with the updated amount of damage to the property; determining, by the processor, a service provider equipped to address the type of damage to the property; and transmitting, to the service provider via a computer network, an electronic work order request indicating the updated amount of damage and the type of damage.

In another embodiment, a system for automatically facilitating work orders is provided. The system may include a transceiver, a memory storing a set of instructions and a machine learning model, and a processor interfaced with the transceiver and the memory. The processor may be configured to execute the set of instructions to cause the processor to: receive, from an electronic device via the transceiver, a set of media depicting a property, analyze, using the machine learning model, the set of media data, including: determine (i) an amount of damage to the property depicted in the set of media, and (ii) a type of damage to the property depicted in the set of media, and assess a confidence level for the amount of damage, wherein the confidence level is below a threshold level, in response to analyzing the set of media data using the machine learning model, avail the set of media for manual review, including: determine, based on the property, a set of individuals needed to manually assess the set of media, each of the set of individuals having a qualification, avail the set of media for review by the set of individuals, receive a set of assessments of the set of media by the set of individuals, calculate an updated amount of damage to the property based on the set of assessments, and update, in the memory, the machine learning model with the updated amount of damage to the property, determine a service provider equipped to address the type of damage to the property, and transmit, to the service provider via the transceiver, an electronic work order request indicating the updated amount of damage and the type of damage.

DETAILED DESCRIPTION

The present embodiments may relate to, inter alia, platforms and technologies for using a machine learning model to dynamically estimate property damage depicted in media submitted by an electronic device. According to certain aspects, systems and methods may compare a confidence level associated with the estimated property damage to a threshold level. Based on the comparison, the systems and methods may determine how to supplement the analysis using crowdsourced electronic devices, which may provide supplemental property damage assessments. The systems and methods may use the supplemental property damage assessments to update the machine learning model for subsequent data analyses. Additionally, the systems and methods may facilitate work order requests with service providers equipped to address the depicted damage. A user of the electronic device that submitted the media may reject or accept the work order request accordingly.

The systems and methods therefore offer numerous benefits. In particular, by comparing a confidence level of an estimated damage amount to a threshold level, the systems and methods may effectively determine when and how to employ crowdsourced resources for a supplemental damage assessment. The crowdsourced resources may provide a damage assessment that is more accurate than the assessment originally determined by the machine learning model. Therefore, the systems and methods may update the machine learning model with more accurate assessments to be used in subsequent media analyses. Additionally, the systems and methods may use accurate damage assessments to automatically facilitate work order requests such that users are afforded the benefits of being matched to appropriate service providers and having visibility into the status of work orders. It should be appreciated that additional benefits are envisioned.

The systems and methods discussed herein address a challenge that is particular to damage assessment applications. In particular, the challenge relates to a difficulty in accurately assessing damage to properties and how to effectively resolve such situations. Conventionally, designated individuals manually review and assess damage to property, or machine learning models output a damage assessment that may be inaccurate. However, these conventional techniques are often time consuming, ineffective, expensive, and/or inaccurate. The systems and methods offer improved capabilities to solve these problems by dynamically determining when and how to leverage crowdsourced resources to provide supplemental assessments to machine learning model analyses, and interfacing with service providers to dynamically facilitate work order requests. Further, because the systems and methods employ communication between and among multiple devices, the systems and methods are necessarily rooted in computer technology in order to overcome the noted shortcomings that specifically arise in the realm of damage assessment applications.

Figure 1A:
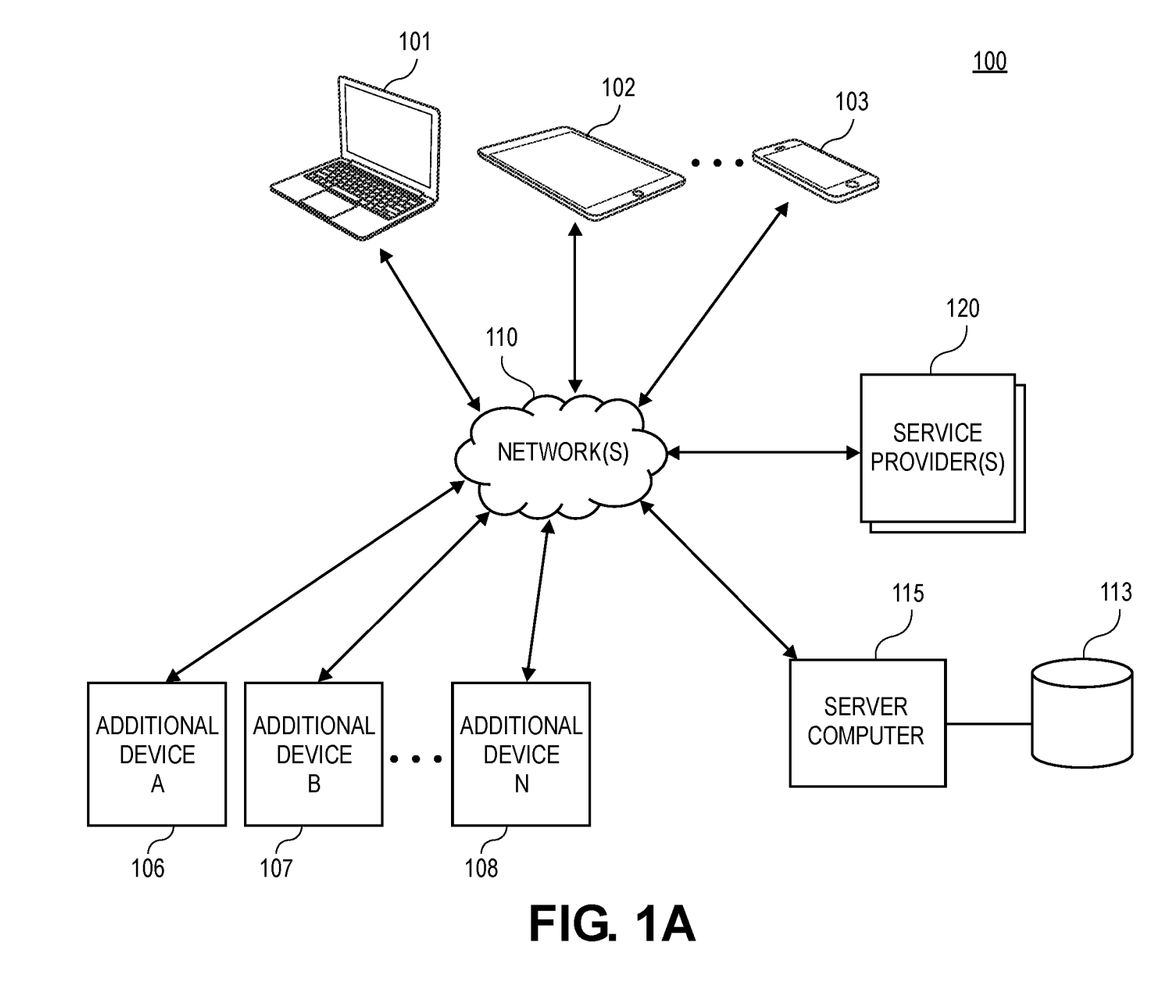
FIG. 1A depicts an overview of components and entities associated with the systems and methods, in accordance with some embodiments.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 101, 102, 103. Each of the electronic devices 101, 102, 103 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like. Generally, each of the electronic devices 101, 102, 103 may be operated by an individual or person (generally, a user) having an association with a property, for example a vehicle, home, or other type of physical property capable of being owned or used. For example, a user may be a policyholder of an insurance policy for a vehicle.

In operation, the user may operate one of the devices 101, 102, 103 to input data or information associated with a property in the event that the property is damaged. In particular, the user may input (e.g., via a keyboard or dictation) a description of the damage to the property. Additionally, the user may use the corresponding device 101, 102, 103 to capture (or access) digital images and/or videos of the property. Generally, the term "media" or "set of media" may be used throughout to describe visual content (e.g., digital images or digital videos) depicting a property. A given set of media may include a set of digital images or videos depicting various views and perspectives of a given property, where the given property may have damage to certain portions or areas to varying degrees.

The electronic devices 101, 102, 103 may communicate with a server computer 115 via one or more networks 110. The server computer 115 may be associated with an entity such as a company, business, corporation, or the like, which manages policies, accounts, or the like for properties associated with users. For example, the server computer 115 may be associated with an insurance company that offers home and/or vehicle insurance policies held by users of the electronic devices 101, 102, 103. The electronic devices 101, 102, 103 may transmit or communicate, via the network(s) 110, the set of media and any another captured or inputted information or data to the server computer 115.

In embodiments, the network(s) 110 may support any type of data communication via any standard or technology including various wide area network or local area network protocols (e.g., GSM, CDMA, VoIP, TDMA, WCDMA, LTE, EDGE, OFDM, GPRS, EV-DO, UWB, Internet, IEEE 802 including Ethernet, WiMAX, Wi-Fi, Bluetooth, and others). Further, in embodiments, the network(s) 110 may be any telecommunications network that may support a telephone call between the electronic devices 101, 102, 103 and the server computer 115.

The system 100 further includes a set of additional devices 106, 107, 108 that may be operable by a set of additional users. According to embodiments, the set of additional devices 106, 107, 108 may be devices capable of supporting an Internet crowdsourcing marketplace to enable individuals and businesses (such as businesses associated with the server computer 115) to coordinate human labor to perform tasks that computers are either unable to do or tasks that may supplement tasks certain tasks performed by computers. An example of such a crowdsourcing marketplace is Amazon Mechanical Turk (MTurk). The server computer 115 may communicate with the set of additional devices 106, 107, 108 via the network(s).

The system 100 additionally includes a set of service providers 120, each of which may represent a business, entity, corporation, or the like that may be equipped to handle or address property repairs, where each service provider 120 may have a central server or other computing device capable of communication with the server computer 115 via the network(s) 110. For example, one of the service providers 120 may represent a vehicle mechanic having an electronic device capable of communication with the server computer 115. For further example, one of the service providers 120 may be a vehicle dealership having a service department with a computing device(s) capable of communication with the server computer 115.

The server computer 115 may be configured to interface with or support a memory or storage 113 capable of storing various data, such as in one or more databases or other forms of storage. According to embodiments, the storage 113 may store data or information associated with any machine learning models that are generated by the server computer 115, any sets of media received from the electronic devices 101, 102, 103, any assessment data received from the set of additional devices 106, 107, 108, and/or any other pertinent data.

According to embodiments, the server computer 115 may employ various machine learning techniques, calculations, algorithms, and the like to generate and maintain a machine learning model associated with media depicting properties that may be damaged. The server computer 115 may initially train the machine learning model using a set of training data (or in some cases, may not initially train the machine learning model). In an implementation, the set of training data may be generated by one or more of the additional devices 106, 107, 108, and transmitted to the server computer 115. Generally, the set of training data may include a set of images and/or video depicting damage to various properties (e.g., vehicles), where the set of training data may include a set of labels input by a set of users who review the set of images and/or video. The storage 113 may store the trained machine learning model.

In operation, the server computer 115 may analyze the set of media received from one or more of the electronic devices 101, 102, 103 using the machine learning model. In analyzing the set of media, the server computer 115 may generate an output that indicates or is descriptive of any property damage depicted in the set of media, as well as a confidence level. The server computer 115 may compare the confidence level to a set threshold level, and may determine whether and how to transmit the set of media to one or more of the additional devices 106, 107, 108 for a supplemental assessment. After the users review the set of media and input a supplemental assessment(s) of the property damage, the one or more additional devices 106, 107, 108 may transmit the supplemental assessment(s) to the server computer 115, which may analyze the supplemental assessment(s) and update the machine learning model accordingly. Additionally, the server computer 115 may generate and transmit a work order to the service provider 120 to facilitate repair of the property damage depicted in the set of media. These functionalities are further described with respect to FIG. 1B and FIG. 2.

Although depicted as a single server computer 115 in FIG. 1A, it should be appreciated that the server computer 115 may be in the form of a distributed cluster of computers, servers, machines, or the like. In this implementation, the entity may utilize the distributed server computer(s) 115 as part of an on-demand cloud computing platform. Accordingly, when the electronic devices 101, 102, 103 and additional devices 106, 107, 108 interface with the server computer 115, the electronic devices 101, 102, 103 and additional devices 106, 107, 108 may actually interface with one or more of a number of distributed computers, servers, machines, or the like, to facilitate the described functionalities. Additionally, although three (3) electronic devices 101, 102, 103, three (3) additional devices 106, 107, 108, and one (1) server computer 115 are depicted in FIG. 1A, it should be appreciated that greater or fewer amounts are envisioned.

Figure 1B:
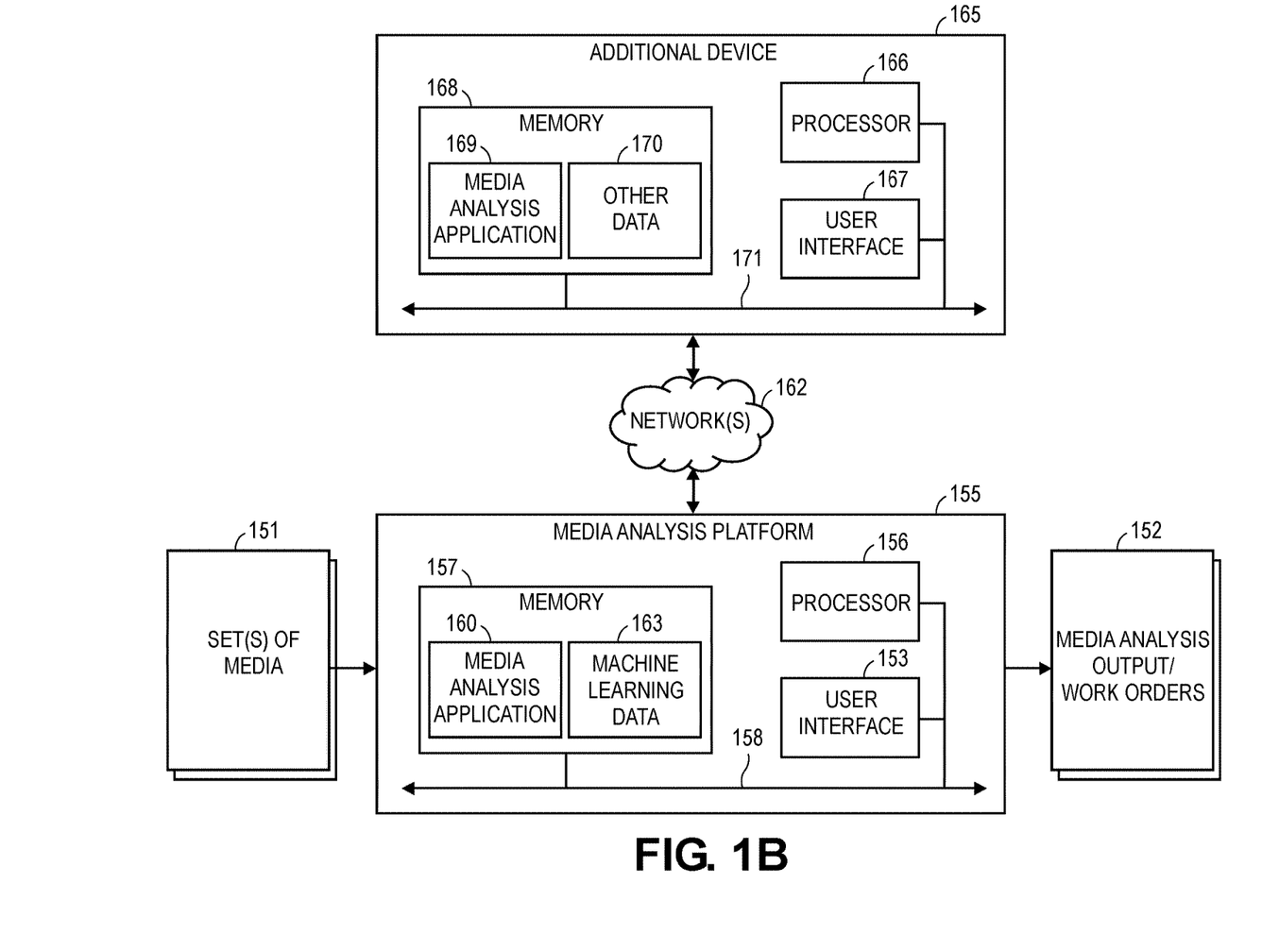
FIG. 1B depicts a detailed representation of certain components configured to facilitate the systems and methods, in accordance with some embodiments.

FIG. 1B an example environment 150 in which a set(s) of media 151 is processed into media analysis output data and/or work order data 152 via a media analysis platform 155, according to embodiments. The media analysis platform 155 may be implemented on any computing device, including the server computer 115 (or in some implementations, one or more of the electronic devices 101, 102, 103) as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156.

In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The media analysis platform 155 may further include a user interface 153 configured to present content (e.g., the set(s) of media 151 and any output data associated with analysis of the set(s) of media 151). Additionally, a user may make selections to the content via the user interface 153, such as to navigate through different information, select and review certain machine learning model output, and/or other actions. The user interface 153 may be embodied as part of a touchscreen configured to sense touch interactions and gestures by the user. Although not shown, other system components communicatively coupled to the system bus 158 may include input devices such as a cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications, data structures, program modules or other data. One of the applications may be a media analysis application 160 configured to analyze the set(s) of media 151 using a machine learning model.

Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The media analysis platform 155 may operate in a networked environment and communicate with one or more remote platforms or devices via a network(s) 162, such as a local area network (LAN), a wide area network (WAN), telecommunications network, or other suitable network. In particular, the media analysis platform 155 may interface with at least one additional device 165 (such as one of the additional devices 106, 107, 108 as discussed with respect to FIG. 1A), which may support an Internet crowdsourcing marketplace for assessing characteristics associated with the set(s) of media 151. In operation, the media analysis platform 155 may transmit the set(s) of media 151 and any supplemental data to the additional device 165 for a supplemental analysis of the set(s) of media 151. Although a single additional device 165 is depicted in FIG. 1B, it should be appreciated that there may be multiple additional devices 165.

The additional device 165 may include a processing unit (e.g., processor(s) 166), a system memory (e.g., memory 168), and a system bus 171 that couples various system components including the memory 168 to the processor(s) 166. In some embodiments, the processor(s) 166 may include one or more parallel processing units capable of processing data in parallel with one another. The system bus 171 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The additional device 165 may further include a user interface 167 configured to present content (e.g., the set(s) of media 151). Additionally, a user may make selections via the user interface 167, such as to navigate through different information, select and review certain machine learning model output, provide damage assessments, and/or other actions. The user interface 167 may be embodied as part of a touchscreen configured to sense touch interactions and gestures by the user. Although not shown, other system components communicatively coupled to the system bus 171 may include input devices such as a cursor control device (e.g., a mouse, trackball, touch pad, etc.) and keyboard (not shown). A monitor or other type of display device may also be connected to the system bus 171 via an interface, such as a video interface. In addition to the monitor, the additional device 165 may also include other peripheral output devices such as a printer, which may be connected through an output peripheral interface (not shown).

The memory 168 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications, data structures, program modules or other data. One of the applications may be a media analysis application 169 configured to cause the user interface 167 to present the set(s) of media 151 for review by the user. The memory 168 may additional store other data 170 that, for example, the processor 166 may use in operating the media analysis application 169.

Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 166.

The media analysis platform 155 may store, as machine learning data 164, any data associated with machine learning models and/or analyzing the set(s) of media 151 using the machine learning models. Additionally, the media analysis application 160 may employ machine learning techniques such as, for example, a regression analysis (e.g., a logistic regression, linear regression, or polynomial regression), k-nearest neighbors, decision trees, random forests, boosting, neural networks, support vector machines, deep learning, reinforcement learning, latent semantic analysis, Bayesian networks, or the like. Generally, the media analysis platform 155 may support various supervised and/or unsupervised machine learning techniques. In an embodiment, the media analysis application 160 may initially train a machine learning model with training data, and store the resulting machine learning model as machine learning data 163. In another embodiment, the media analysis application 160 may generate and update the machine learning model, and the corresponding machine learning data 163, based on the received set(s) of media 151 and/or any results received form the additional device 165. Functionalities of the media analysis platform 155 and the additional device 165 are further described with respect to FIG. 2.

In general, a computer program product in accordance with an embodiment may include a computer usable storage medium (e.g., standard random access memory (RAM), an optical disc, a universal serial bus (USB) drive, a big data processing engine, a NoSQL repository, or the like) having computer-readable program code embodied therein, wherein the computer-readable program code may be adapted to be executed by the processors 156, 166 (e.g., working in connection with an operating systems) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources. Generally, each of the data 151 and the data 152 may be embodied as any type of electronic document, file, template, etc., that may include various textual and visual content, and may be stored in memory as program data in a hard disk drive, magnetic disk and/or optical disk drive in the media analysis platform 155 and/or the additional device 165.

Figure 2:
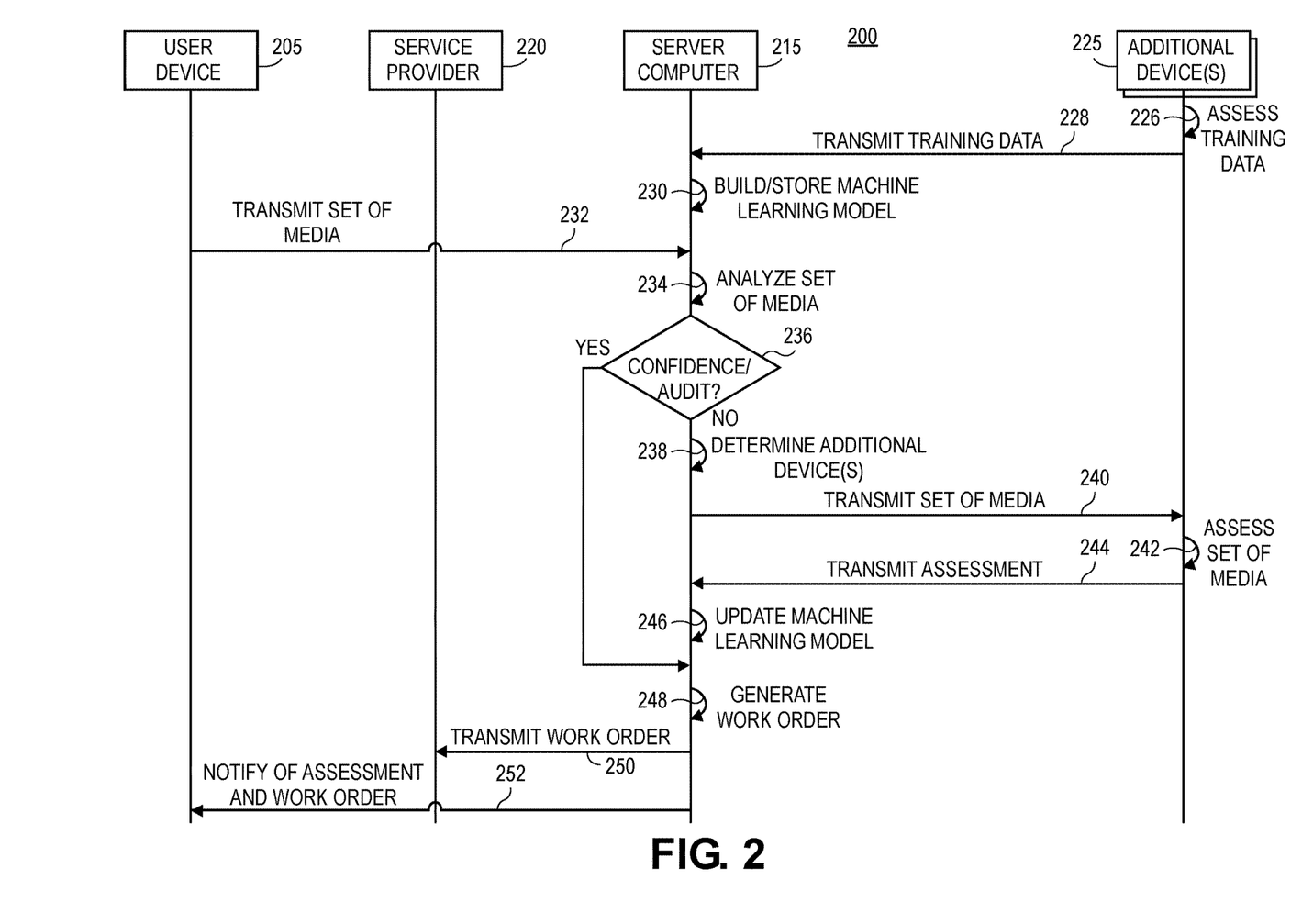
FIG. 2 depicts a signal diagram of certain components and functionalities associated therewith, in accordance with some embodiments.

FIG. 2 depicts a signal diagram 200 including various functionalities of the systems and methods. The signal diagram 200 includes a user device 205 (such as one of the user devices 101, 102, 103 as discussed with respect to FIG. 1A), a service provider 220 (such as the service provider(s) 120 as discussed with respect to FIG. 1A), a server computer 215 (such as the server computer 115 as discussed with respect to FIG. 1A), and a set of additional devices 225 (such as the set of additional devices 106, 107, 108 as discussed with respect to FIG. 1A). It should be appreciated that the amount of additional devices 225 may vary, where each additional device 225 may be operated by a human (generally, a user). Although the functionalities of FIG. 2 are described with respect to assessing media depicting a vehicle, it should be appreciated that the functionalities may be applied to other property types (e.g., homes and other physical properties).

The signal diagram 200 may start when the set of additional devices 225 assess (226) a set of training data. Generally, the set of training data may include real-world or simulated media (e.g., images, videos, alphanumeric content, and/or the like) that depicts various property (e.g., vehicles or homes) having various levels of damage. In assessing the set of training data, the corresponding user of the additional device 225 may apply or otherwise specify a label or tag to each item of media. For example, the set of training data may include a series of images depicting various degrees of damage to various vehicles, and the users of the additional devices 225 may specify labels descriptive of the vehicles and/or of the damage to the vehicles (e.g., "sedan," "minivan," "SUV," "total loss," "body damage," "broken windshield," "flat tire," etc.).

The set of additional devices 225 may transmit (228) the labeled training data to the server computer 215. As a result, the server computer 215 may build and store (230) a machine learning model using the labeled training data. The machine learning model may thus be descriptive of various types and degrees of damage to various types of properties (e.g., different vehicle make, models, and types), where the server computer 215 may use the machine learning model to assess additional media depicting additional properties. The machine learning model may additionally associate damage repair amounts with the types of damage, where the damage repair amounts may be based on the type and/or age of the property.

The user device 205 may transmit (232) a set of media to the server computer 215, where the set of media transmitted by the user device 205 may depict a property associated with a user of the user device 205, and may depict damage to the property. In operation, the transmission of the set of media may be in association with the user filing an insurance claim in response to the occurrence of damage to the property. In embodiments, the set of media may be supplemented with a description of the damage inputted by the user, and/or with information that identifies the user and/or the property (e.g., a make, model, and year of the vehicle, an odometer reading of the vehicle, etc.). For example, the set of media may be five (5) images of a damaged SUV, with appended text describing damage to the driver's side doors of the SUV.

The server computer 215 may analyze (234) the set of media transmitted from the user device 205. In particular, the server computer 215 may use the stored machine learning model to analyze the set of media. In analyzing the set of media using the machine learning model, the server computer 215 may generate an output that estimates a type and amount of damage depicted in the set of media as well as a confidence level for the estimated type and amount of damage. For example, the server computer 215 may output that the transmitted set of media depicts damage to the rear driver's side door, having an estimated repair cost of $1,500, and with a confidence level of 60%. In some implementations, the server computer 215 may additionally output a make, model, and year of the depicted vehicle (such as in situations in which this information is not included in the originally-submitted information). It should be appreciated that the server computer 215 may determine the confidence level using a variety of techniques or calculations, which may be based on a quality level and/or completeness of the data received from the user device 205.

According to embodiments, there may be a confidence threshold level associated with the output from the machine learning model, where the confidence threshold level may be a default value or specified by an administrator associated with the server computer 215. Additionally, there may be multiple confidence threshold levels that may be based on such factors as make, model, and year of a vehicle, amount of miles on the odometer, the estimated amount of damage, and/or other factors. For example, a first confidence threshold level may be 60% for a vehicle that is over ten (10) years old and having an estimated damage amount of $2,000 and under; and another confidence threshold level may be 90% for a vehicle that is less than two (2) years old and having an estimated damage amount of $10,000 and over. The server computer 215 may store the confidence threshold levels as well as a set of rules for applying the confidence threshold levels.

The server computer 215 may determine (236) whether the confidence level that is output from the machine learning model analysis at least meets the corresponding confidence level threshold. If the outputted confidence level at least meets the corresponding confidence level threshold ("YES"), processing may proceed to (248). In contrast, if the outputted confidence level does not meet the corresponding confidence level ("NO"), processing may proceed to (238).

In embodiments, the server computer 215 may additionally or alternatively facilitate employ an audit threshold in association with the output from the machine learning model. Generally, a portion of the outputs from the machine learning model may have a high confidence level (e.g., greater than 90%) but be inaccurate or wrong, where the audit threshold may be used to validate (i.e., spot check) certain outputs from the machine learning model (e.g., those with a confidence level that exceeds a threshold level, for example 90%) to further improve accuracy. The audit threshold may be a default amount or may be specified by an administrator associated with the server computer 215. For example, if the audit threshold is 5% and the applicability is a confidence level of at least 95%, the server computer 215 may "flag" 5% of the machine learning model outputs having a confidence level of at least 95%.

If the output from the machine learning model passes the audit threshold (i.e., is not flagged), processing may proceed to (248). In contrast, if the output from the machine learning model does not pass the audit threshold (i.e., is flagged), processing may proceed to (238). In this regard, at least a portion of the outputs having a higher confidence level may be additionally assessed by the additional device(s) 225.

At (238), the server computer 215 may determine whether and how to use the additional devices 225 in a further assessment of the set of media. According to embodiments, the users of the additional devices 225 may have different licenses, qualifications, experience, and/or the like, and the assessment of the set of media (or more particularly, the property and characteristics thereof depicted in the set of media) may require a user(s) having a specific license, qualification, experience, and/or the like. For example, if a vehicle depicted in the set of media is registered to a policyholder in Illinois, there may be a requirement that the users of the additional devices 225 be claim handlers with a license in Illinois. As a further example, if a vehicle depicted in the set of media has an MSRP of over $150,000, there may be a requirement that the users of the additional devices 225 have previous experience assessing vehicles having a comparable MSRP.

The determination of (238) may also involve determining an amount of additional devices 225 needed for the additional assessment, where the amount may be based on such factors as the age, make, and/or model of the vehicle, the MSRP of the vehicle, the estimated amount of damage output by the machine learning model, the confidence level of the output from the machine learning model, and/or other factors. For example, if the vehicle depicted in the set of media is less than two (2) years old and has an estimated amount of damage greater than $15,000, the server computer 215 may determine that fifteen (15) additional devices 225 are needed for the additional assessment. For further example, if the vehicle depicted in the set of media is over ten (10) years old and rear bumper damage, the server computer 215 may determine that three (3) additional devices 225 are needed for the additional assessment. It should be appreciated that the server computer 215 may additionally store a set of rules that the server computer 215 may use to make the determination(s) of (238), where the set of rules may be default or configurable by an administrator.

After determining the additional devices 225, the server computer 215 may transmit (240) the set of media to the determined additional devices 225. It should be appreciated that the determined additional devices 225 may or may not overlap with the additional devices 225 that initially assessed the training data. The transmission of the set of media to the determined additional devices 225 may include a request to assess or estimate an amount of damage to the property depicted in the set of media, as well as additional information or instructions, such as information associated with the property, an output from the machine learning model analysis, and/or other information. Additionally, the server computer 215 may transmit all or a portion of the set of media originally transmitted by the user device 205.

The users of the determined additional devices 225 may use the determined additional devices 225 to assess (242) the set of media. In particular, the users may make necessary inputs or selections via the determined additional devices 225 to specify information associated with an assessment of the damage to the property depicted in the set of media. For example, the users may input or specify a description of the damage, damaged areas or portions of the property, an estimated cost to repair the damage, an estimated amount of time needed to repair the damage, a type of service provider having expertise needed to repair the damage, and/or other information.

The determined set of additional devices 225 may transmit (244) information associated with the assessment to the server computer 215. In particular, the determined set of additional devices 225 may transmit a description of the damage, damaged areas or portions of the property, an estimated cost to repair the damage, an estimated amount of time needed to repair the damage, a type of service provider having expertise needed to repair the damage, and/or other information. The server computer 215 may update (246) the machine learning model according to the assessment information received from the determined set of additional devices 225. In particular, the server computer 215 may add, to the machine learning model, at least a portion of the set of media, such as the set of media assessed by the determined set of additional devices 225. In situations in which the set of media is transmitted to the additional device(s) 225 in response to being flagged via the audit threshold, the server computer 215 may update the machine learning model to reflect both the original machine learning model output and the assessment completed by the additional device(s) 225, such that any differences may be reconciled with the originally-determined confidence level.

Additionally, the server computer 215 may append any assessment information to the set of media added to the machine learning model. In embodiments, the server computer 215 may determine, from the received assessment information, an updated estimate of the amount of damage to the vehicle (e.g., by averaging any received damage estimates, or by other calculations). Accordingly, the updated machine learning model may accurately reflect the information associated with the set of media as assessed by the users of the determined set of additional devices 225.

At (248), the server computer 215 may generate a work order to address or handle the damage to the property that is depicted in the set of media. In generating the work order, the server computer 215 may identify a service provider (i.e., the service provider 220) based on the information included in the analysis by the machine learning model or the assessment performed by the determined set of additional devices 225. For example, the assessment by the determined set of additional devices 225 may indicate that a windshield replacement is necessary for a vehicle, and the server computer 215 may automatically identify a mechanic that is able to replace the windshield. For further example, the analysis by the machine learning model may indicate that a vehicle of a particular make and model needs engine repair, and the server computer 215 may automatically identify a service provider that specializes in vehicles of the same make and model. According to embodiments, the server computer 215 may maintain, in memory, a database or records of service providers, as well as capabilities and specialties, location, contact information, and/or other information associated with the service providers.

The server computer 215 may transmit (250) the work order to the determined service provider 220. Additionally, the server computer 215 may notify (252) the user device of the assessment and the work order. In particular, the server computer 215 may transmit any information resulting from the analysis by the machine learning model and/or the assessment by the determined set of additional devices 225, as well as an indication of the service provider 220 and the work order transmitted to the service provider 220. Accordingly, the owner or individual associated with the damaged property may make arrangements with the service provider 220 to address the damage. In an implementation, the user device 205 may enable the owner or individual associated with the damaged property to approve (or not approve) of the work order.

FIGS. 3A, 3B, 4A, and 4B depict example interfaces associated with the systems and methods. In embodiments, the interfaces may be displayed by a computing device. Generally, the interfaces of FIGS. 3A and 3B may be displayed by a computing device associated with a service provider, such as one of the service providers 120 as discussed with respect to FIG. 1A. Further, the interfaces of FIGS. 4A and 4B may be displayed by a computing device operated by a user having an association with a property (e.g., a policyholder) and/or who submits a set of media depicting the property. The interfaces may be accessed and reviewed by a user, where the user may make selections, submit modifications, or facilitate other functionalities.

Figure 3A:
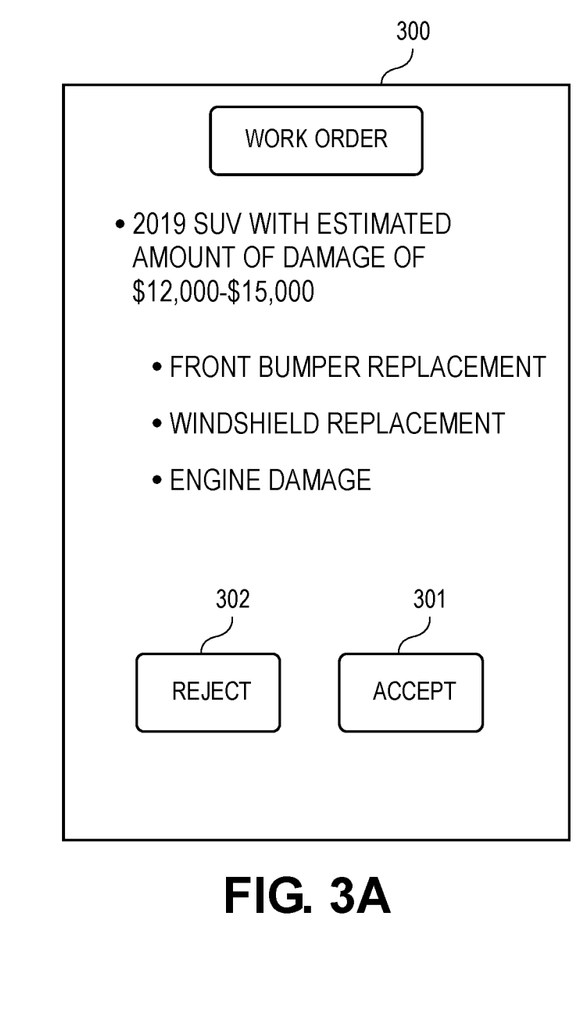
FIGS. 3A, 3B, 4A, and 4B depict example interfaces associated with reviewing, accepting, and submitting work orders, in accordance with some embodiments.
Figure 3B:
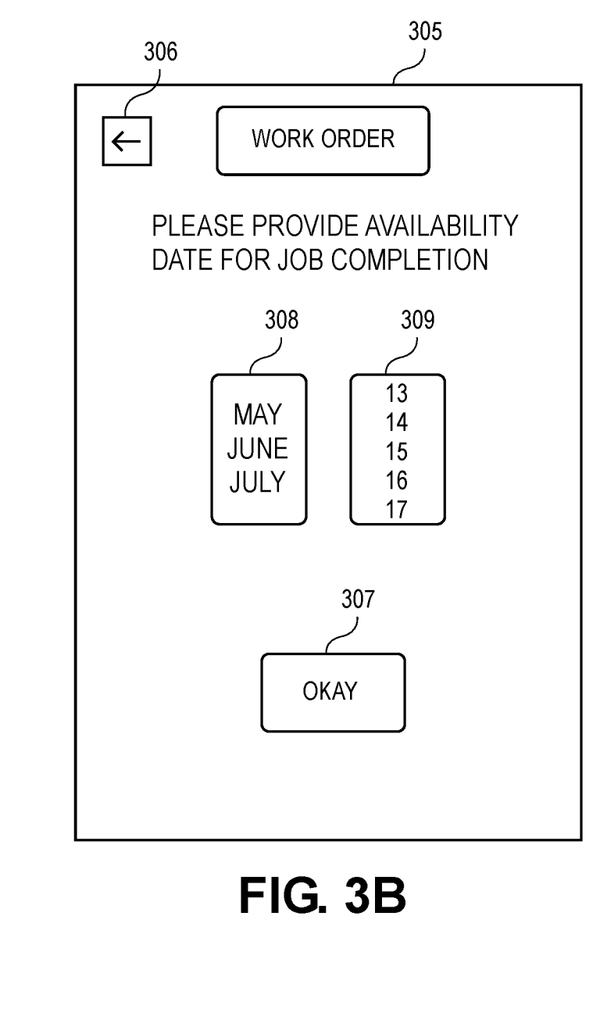

FIGS. 3A and 3B depict example interfaces associated with an electronic work order that is submitted to a service provider, where the interfaces may be displayed by an electronic device associated with the service provider. Generally, a server computer, such as the server computer 115 as discussed with respect to FIG. 1A, may determine the service provider, generate a work order describing the property (e.g., a vehicle) and damage to the property, and transmit the work order to the determined service provider.

FIG. 3A depicts an interface 300 describing the work order, which indicates that a 2019 SUV has an estimated amount of damage of $12,000-$15,000, namely, a front bumper replacement, a windshield replacement, and engine damage. A user associated with the service provider may review the interface 300 and select whether to accept (301) or reject (302) the work order. In embodiments, if the user rejects (302) the work order, the server computer may determine an alternative service provider and transmit the work order to the alternative service provider.

If the user accepts (301) the work order, the computing device may display an interface 305 as depicted in FIG. 3B. The interface 305 may enable the user to input an availability date for completion of the job, in particular via a month selection 308 and a day selection 309. The interface 305 may also enable the user to navigate back (306) to the interface 300 of FIG. 3A. Additionally, the interface 305 includes an okay selection 307 to enable the user to confirm or accept the work order with the entered job completion date. After the user selects the okay selection 307, the computing device may transmit the acceptance to the server computer.

Figure 4A:
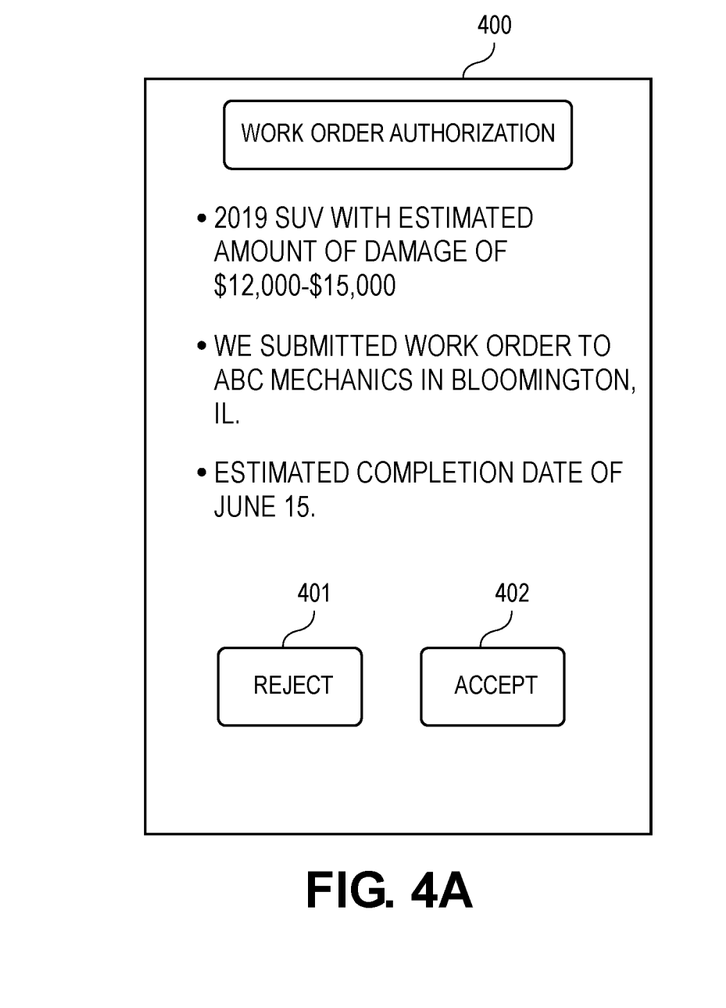

FIG. 4A depicts an interface 400 describing an authorization for a work order. According to embodiments, in response to the server computer receiving a work order acceptance from the service provider, the server computer may generate and transmit the work order authorization to a computing device operated by the user having an association with the property. The interface 400 may describe the property and the estimated damage to the property, along with an indication that the work order was submitted to ABC Mechanics in Bloomington, IL with an estimated completion date of June 15. The user may review the interface 400 and select whether to accept (401) or reject (402) the work order authorization. In embodiments, if the user rejects (402) the work order authorization, the server computer may determine an alternative service provider and attempt to facilitate acceptance of a work order between the user and the alternative service provider.

Figure 4B:
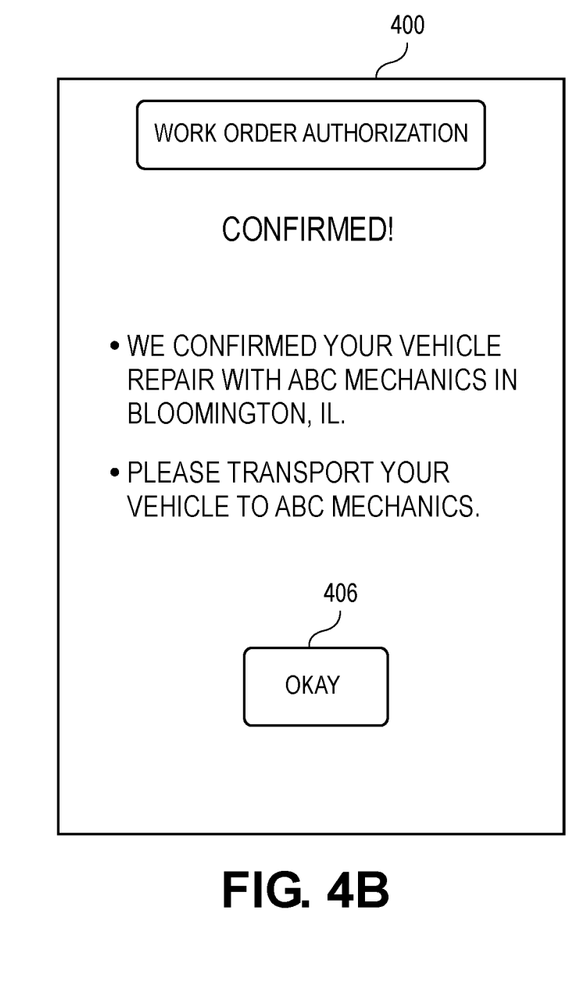

If the user accepts (401) the work order authorization, the computing device may display an interface 405 as depicted in FIG. 4B. The interface 405 may indicate that the work order is confirmed with ABC Mechanics in Bloomington, IL, and may instruct the user to transport the vehicle to ABC Mechanics. The user may select to dismiss the interface 405 via an okay selection 406.

Figure 5:
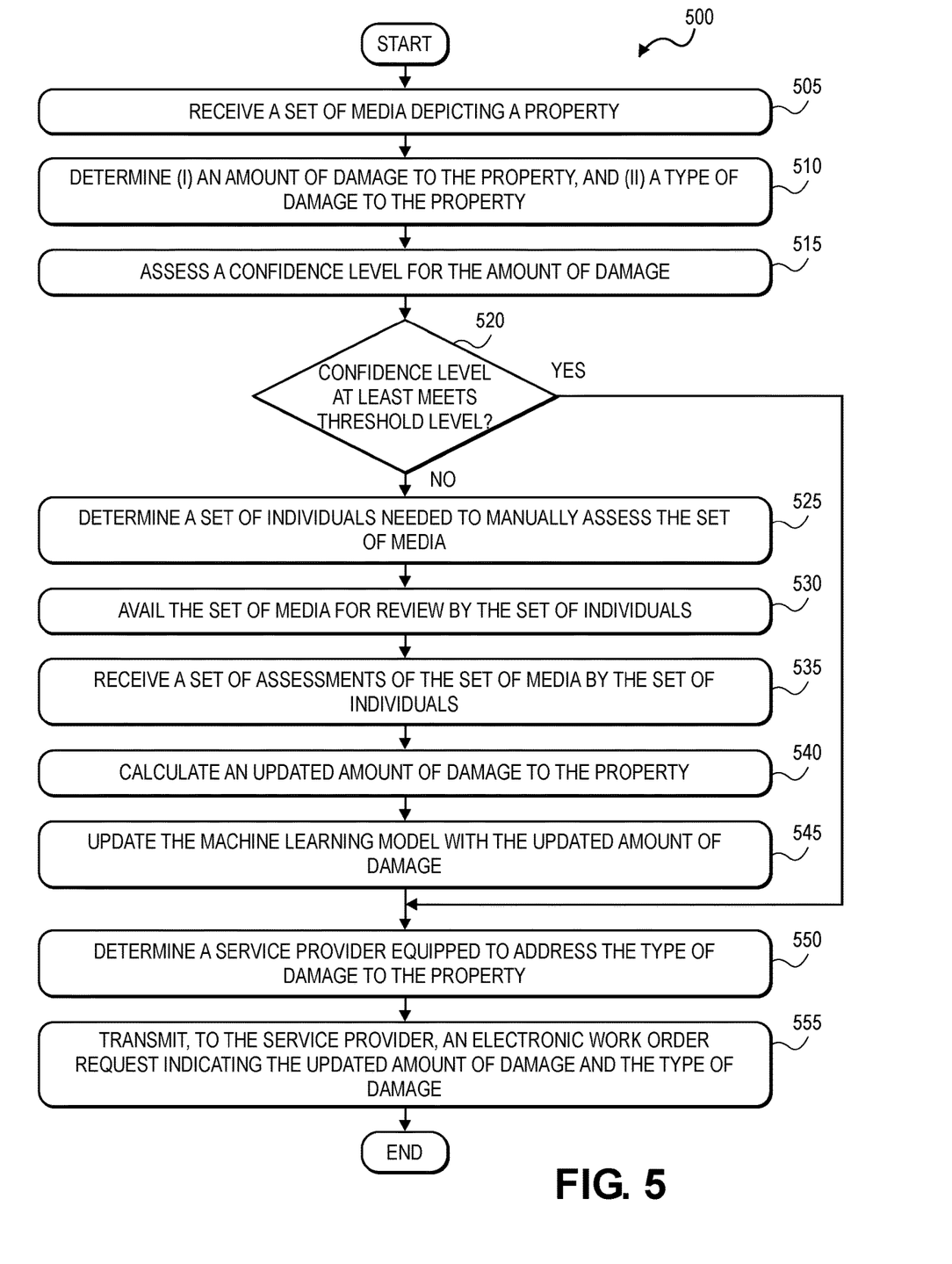
FIG. 5 is an example flowchart associated with using machine learning models to analyze a set of media and facilitate work orders, in accordance with some embodiments.

FIG. 5 depicts is a block diagram of an example method 500 for using a machine learning model to automatically facilitate work orders. The method 500 may be facilitated by an electronic device (such as the server computer 115 or components associated with the media analysis platform as discussed with respect to FIGS. 1A and 1B) that may be in communication with additional devices and/or data sources.

The method 500 may begin when the electronic device receives (block 505) a set of media depicting a property. In embodiments, the electronic device may receive the set of media from one or more user devices operated by one or more users, or from another data source, where the set of media may be a set of digital images and/or videos that visually depict the property (e.g., a vehicle) and damage or potential damage to the property.

The electronic device may analyze the set of media data to determine (block 510) (i) an amount of damage to the property, and (ii) a type of damage to the property. In embodiments, the electronic device may analyze the set of media data using a machine learning model that may a supervised or unsupervised machine learning model. If the machine learning model is supervised, the machine learning model may be trained using a set of labels associated with a set of training media, where the set of labels may be specified by a set of individuals operating a set of additional devices. The determined amount of damage to the property and the type of damage to the property may be embodied as an output from the machine learning model analysis.

The electronic device may assess (block 515) a confidence level for the amount of damage. Additionally, the electronic device may determine (block 520) whether the confidence level at least meets a threshold level. In embodiments, the threshold level may be based on the amount of damage to the property depicted in the set of media, and/or based on other information (e.g., an age of the property), such that the electronic device may compare the confidence level to the appropriate threshold level. Additionally or alternatively, the electronic device may flag the output from the machine learning model analysis according to an audit threshold (e.g., 5%), where the electronic device may apply the audit threshold when the confidence level at least meets a certain threshold (e.g., 95%).

If the confidence level at least meets the threshold level ("YES") and, optionally, if the output is not flagged by the audit threshold, processing may proceed to block 550. If the confidence level does not at least meet the threshold level ("NO") or, optionally, if the output is flagged by the audit threshold, the electronic device may determine (block 525) a set of individuals needed to manually assess the set of media. In embodiments, the electronic device may also determine an amount of individuals needed in the set of individuals, which may be based on at least one of an age of the property, a value of the property, or another metric or parameter. Additionally or alternatively, the electronic device may determine the set of individuals based on each of the set of individuals having a certain qualification or license to assess damage to the property.

The electronic device may avail (block 530) the set of media for review by the set of individuals. In embodiments, the electronic device may transmit, to a set of additional electronic devices associated with the set of individuals, at least a portion of the set of media and information descriptive of the property. The set of additional electronic devices may be additional devices configured to present content (e.g., the portion of the set of media and the information descriptive of the property) and receive selections from the set of individuals (e.g., an assessment of the damage depicted in the portion of the set of media).

The electronic device may receive (block 535) a set of assessments of the set of media by the set of individuals. In embodiments, the electronic device may receive the set of assessments from the set of additional electronic devices (e.g., the additional devices) associated with the set of individuals. The electronic device may calculate (block 540) an updated amount of damage to the property based on the received set of assessments. In embodiments, each of the set of assessments may indicate an assessed amount of damage to the property, and the electronic device may calculate the updated amount of damage as an average of the set of assessed amount of damage indicated in the set of assessments. It should be appreciated that other calculations of the updated amount of damage are envisioned.

The electronic device may update (block 545) the machine learning model with the updated amount of damage. In embodiments, the electronic device may update the machine learning model by associating at least a portion of the set of media with the updated amount of damage and information descriptive of the property. In this regard, the machine learning model may be improved and may be subsequently used by the electronic device for more accurate property assessment.

The electronic device may determine (block 550) a service provider equipped to address the type of damage to the property. In embodiments, the electronic device may determine the service provider based on at least one of a location of the electronic device, the updated amount of damage to the property, an age of the property, a type of the property, or other metrics or characteristics.

The electronic device may transmit (block 555), to the service provider, an electronic work order request indicating the updated amount of damage and the type of damage, where the service provide may select whether to accept or reject the electronic work order request. Additionally, the electronic device may transmit, to an appropriate user device (e.g., a device operated by a user to originally submitted the set of media), a notification indicating the electronic work order and the service provider, wherein the electronic device enables the user to select to confirm or reject the electronic work order.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A method implemented on a computing device having a processor and a non-transitory computer-readable medium, the method comprising:
   receiving, by the processor and from a first electronic device, image data depicting a property;
   inputting, by the processor, the image data as an input to a machine learning model;
   determining, by the processor, based on the image data, and using the machine learning model, a first estimate of a damage to the property, the first estimate including a confidence level associated with the first estimate;
   determining, by the processor, that the confidence level is below a threshold level;
   based on determining that the confidence level is below the threshold level, transmitting, by the processor, to a second computing device in communication with the first computing device, and via a network, the image data, and a request executable by the second computing device, the request causing the second computing device to:
   generate a damage assessment, the damage assessment including a second estimate of the damage, and an annotation associated with the image data, and
   provide the damage assessment to the processor via the network;
   updating, by the processor, the machine learning model using the damage assessment;
   determining, by the processor, and using the updated machine learning model, a third estimate of the damage; and
   transmitting, by the processor, via the network, and to the first electronic device, a work order including the third estimate of the damage.

2. The method of claim 1, wherein the image data depicting the property indicates a state in which the property is registered, and
   the second computing device is operated by a person licensed to practice in the state.

3. The method of claim 1, wherein the image data depicting the property includes a manufacturer's suggested retail price (MSRP) value that exceeds a threshold, and
   the second computing device is operated by a person that has experience of assessing other properties having comparable MSRP values.

4. The method of claim 1, wherein the first estimate indicates at least one of a type of the damage, an estimated amount of the damage, or an estimated repair cost.

5. The method of claim 1, wherein the first estimate includes at least a second confidence level determined based on a parameter associated with the property, and the method further comprising:
   determining, by the processor, that the second confidence level is greater than or equal to an audit threshold level;
   based on determining that the second confidence level is greater than or equal to the audit threshold level, determining, by the processor, a portion of the image data to be used for the damage assessment; and
   transmitting, by the processor, the portion of the image data to the second computing device, causing the second computing device to provide the annotation on the portion of the image data and generate the second estimate based on the portion of the image data and the annotation.

6. The method of claim 1, wherein the property is a vehicle, and the computer-implemented method further comprises:
   receiving, by the processor, additional information associated with the vehicle; and
   inputting, by the processor, the image data and the additional information as the input to the machine learning model,
   wherein the additional information includes at least one of a make, a model, a year, or an odometer reading of the vehicle.

7. A system, comprising:
   a non-transitory computer-readable memory storing a set of instructions; and
   a processor configured to execute the set of instructions to cause the processor to perform actions including:
   receiving, from an electronic device, image data depicting a property;
   determining, based at least in part on the image data, and using a machine learning model, a first estimate of a damage to the property, the first estimate of the damage including a confidence level associated with the estimate;

determining that the confidence level is below a threshold level;
based on the determining that the confidence level is below the threshold level,
transmitting, to a computing device in communication with the processor, and via a network, the image data and a request executable by the computing device,
the request causing the computing device to:
  generate a damage assessment, the damage assessment including a second estimate of the damage and an annotation associated with the image data, and
  provide the damage assessment to the processor via the network;
updating the machine learning model using the damage assessment; and
determining, based on the updated machine learning model, a third estimate of the damage.

8. The system of claim 7, wherein the processor is caused to perform actions further including:
transmitting, to a service provider, an electronic work order including the third estimate of the damage.

9. The system of claim 8, wherein the processor is caused to perform actions further including:
transmitting, to the electronic device, a notification indicating the electronic work order and the service provider,
wherein the electronic device enables a user to select to confirm the electronic work order.

10. The system of claim 7, wherein the image data depicting the property indicates a state in which the property is registered, and
the computing device is operated by a person licensed to practice in the state.

11. The system of claim 7, wherein the first estimate of the damage includes at least one of a type of the damage, an estimated amount of the damage, or an estimated repair cost.

12. The system of claim 11, wherein the property is a vehicle and wherein the first estimate includes at least a second confidence level determined based on a parameter associated with the vehicle, and the processor is caused to perform actions further including:
determining that the second confidence level is greater than or equal to an audit threshold level;
based on determining that the second confidence level is greater than or equal to the audit threshold level, determining a portion of the image data to be used for the damage assessment; and
transmitting, to the computing device, the portion of the image data, causing the computing device to provide the annotation on the portion of the image data and generate the second estimate based on the portion of the image data and the annotation.

13. The system of claim 7, wherein the property is a vehicle, and the processor is caused to perform actions further including:
receiving additional information associated with the vehicle; and
inputting the image data and the additional information as the input to a machine learning model,
wherein the additional information includes at least one of a make, a model, a year, or an odometer reading of the vehicle.

14. A non-transitory computer-readable storage medium storing computer-readable instructions, that when executed by a processor, cause the processor to perform actions comprising:
receiving, from an electronic device, image data depicting a property;
determining, based at least in part on the image data, and using a machine learning model, a first estimate of a damage to the property, the estimate of the damage including a confidence level associated with the estimate;
determining that the confidence level is below a threshold level;
based on determining that the confidence level is below the threshold,
transmitting, to a computing device in communication with the processor, and via a network, the image data and a request executable by the computing device in communication with the processor via a network,
the request causing the computing device to:
  generate a damage assessment, the damage assessment including a second estimate of the damage and an annotation associated with the image data, and
  provide the damage assessment to the processor via the network;
updating the machine learning model using the damage assessment; and
determining, based on the updated machine learning model, a third estimate of the damage.

15. The non-transitory computer-readable storage medium of claim 14, wherein the property is a vehicle, and the processor is caused to perform actions further including:
receiving additional information associated with the vehicle; and
inputting the image data and the additional information as the input to a machine learning model,
wherein the additional information includes at least one of a make, a model, a year, or an odometer reading of the vehicle.

16. The non-transitory computer-readable storage medium of claim 14, wherein the first estimate of the damage includes at least one of a type of the damage, an estimated amount of the damage, or an estimated repair cost, and the processor is caused to perform actions further including:
determining that the second confidence level is greater than or equal to an audit threshold level;
based on determining that the second confidence level is greater than or equal to the audit threshold level, determining a portion of the image data to be used for the damage assessment; and
transmitting, to the computing device, the portion of the image data, the computing device providing the annotation on the portion of the image data and generating the second estimate based on the image data and the annotation.

17. The non-transitory computer-readable storage medium of claim 14, wherein the processor is caused to perform actions further including:
transmitting, to a service provider, an electronic work order including the third estimate of the damage.

18. The method of claim 1, further comprising:
determining, by the processor, the second computing device for the damage assessment based on at least one of:
a manufacturer's suggested retail price (MSRP) value of the property,
an age of the property,
a make of the property, or
a model of the property.

19. The method of claim 1, wherein the damage assessment further includes an additional cost to repair the damage, and the method further comprises:
   updating, by the processor, the machine learning model using the additional cost to repair the damage.

20. The method of claim 1, wherein the damage assessment further includes a service provider having expertise needed to repair the damage, and the method further comprises:
   transmitting, by the processor and to the service provider, an electronic work order including the third estimate of the damage.

* * * * *